Aug. 5, 1952 — L. B. LINDEMUTH — 2,606,111
AGGLOMERATION OF METAL BEARING MATERIALS
Filed May 2, 1949 — 2 SHEETS—SHEET 1
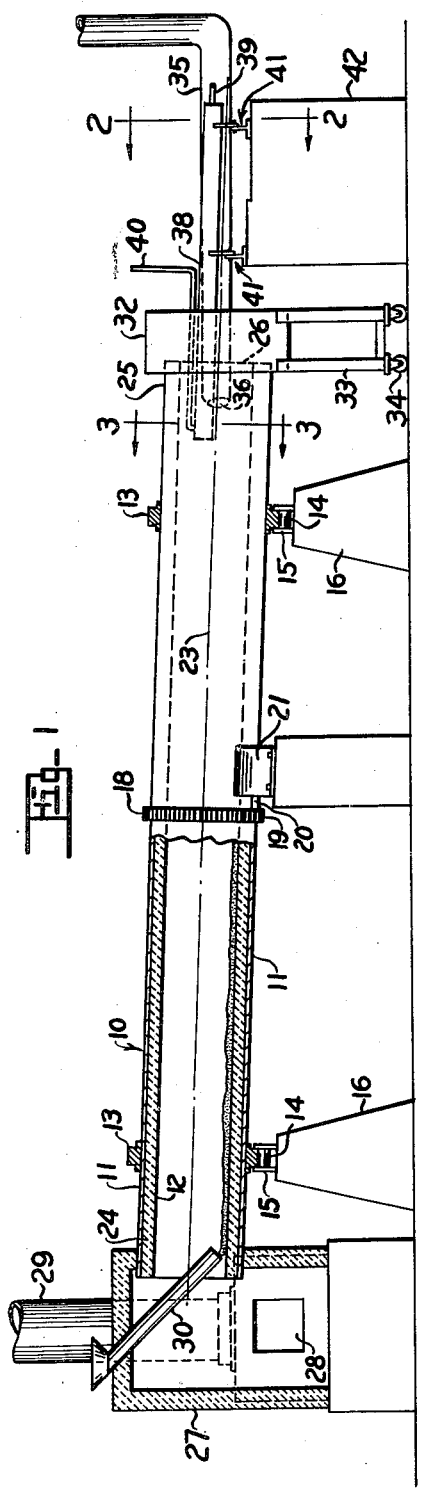
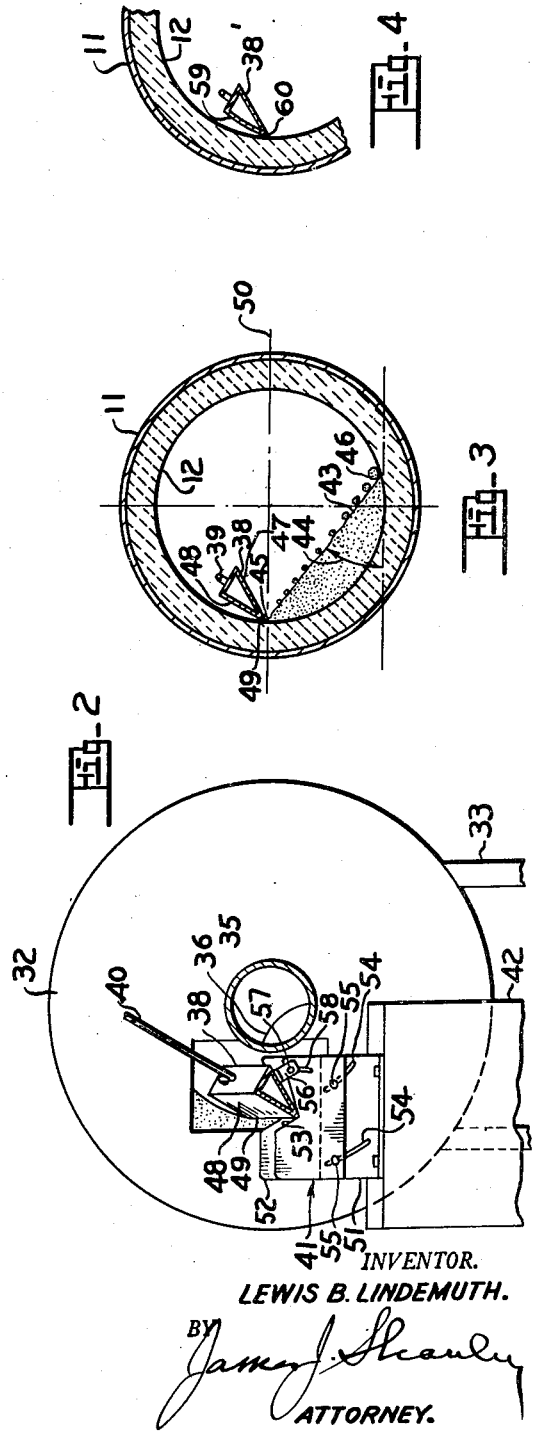
INVENTOR.
LEWIS B. LINDEMUTH.
BY James J. Shanley
ATTORNEY.

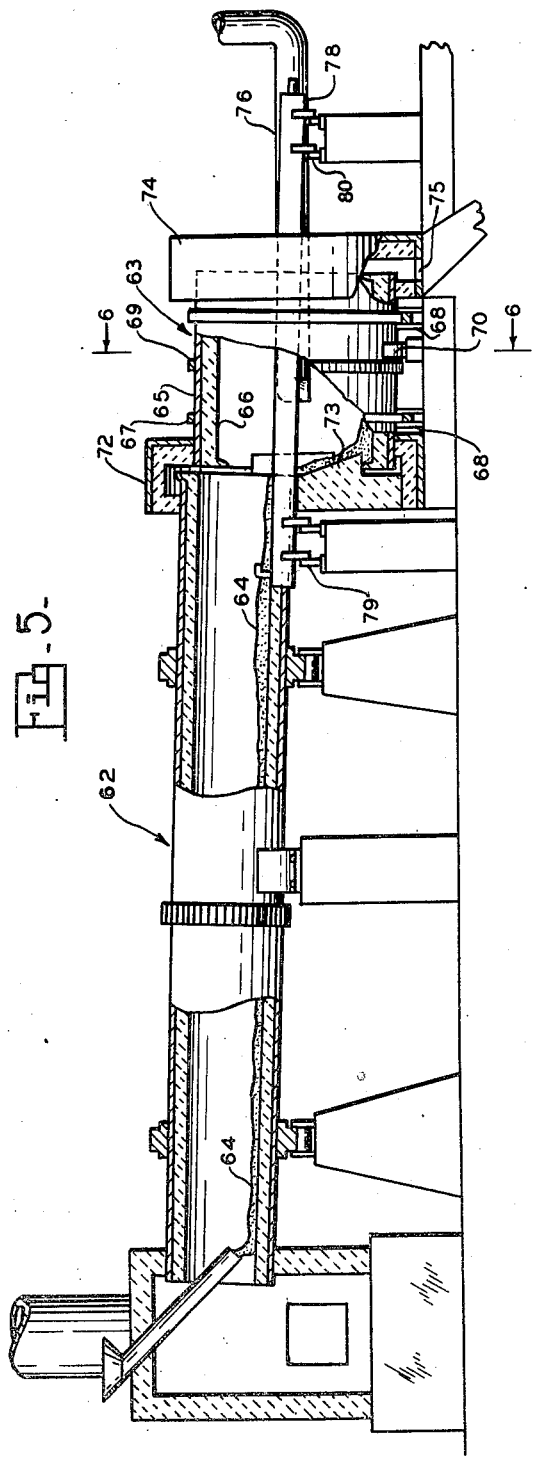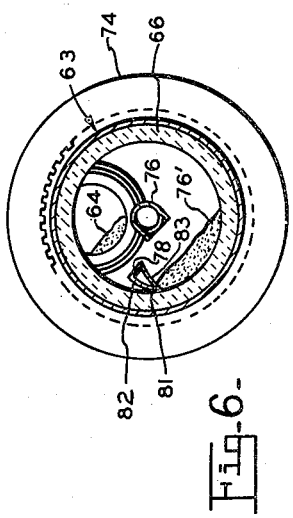
INVENTOR
LEWIS B. LINDEMUTH
ATTORNEY

Patented Aug. 5, 1952

2,606,111

UNITED STATES PATENT OFFICE 2,606,111

AGGLOMERATION OF METAL BEARING MATERIALS

Lewis B. Lindemuth, Port Washington, N. Y., assignor, by mesne assignments, to Great Lakes Steel Corporation, Wilmington, Del., a corporation of Delaware Application May 2, 1949, Serial No. 90,969

7 Claims. (Cl. 75—5)

The present invention relates to a method of and apparatus for heating and fusing particles of finely divided material to form relatively large agglomerates, bodies or nodules of fused particles.

The present invention will be described in connection with the agglomeration of relatively fine particles of iron bearing materials and more particularly in connection with iron oxide bearing materials, such as flue dust, finely divided iron ore, mill scale, and the like. It is to be understood that this invention is not limited to such metal bearing or iron bearing materials and can be used where heating and fusion of other iron bearing materials or other materials are effected in the manner described and claimed.

This application is a continuation-in-part of my copending application Serial No. 13,493, filed March 6, 1948, now abandoned.

Finely divided iron bearing material cannot readily be used in most metallurgical furnaces. Especially where such material is to be used in the open hearth furnace to replace part or all of the scrap metal charge, the material should be formed into relatively dense bodies, preferably having a relatively high percentage iron content. In accordance with this procedure, such material is continuously fed into the upper end of an inclined rotary furnace that is continuously rotated about its longitudinal axis. The rotation of the furnace causes the material to be thoroughly mixed as it moves down through the furnace in a relatively uniform layer and causes the layer to assume an angle of repose with one edge higher than the other edge. As the layer of material moves down through the furnace, it is gradually uniformly preheated and this preheating is aided by the mixing caused by rotation of the furnace. When the preheated material reaches the fusion zone at the lower or outlet end of the furnace, at least portions of the material are brought to, or slightly above the fusion temperature. The particles which are at the fusion temperature are somewhat pasty or sticky and tend to adhere to each other to form relatively small nodules. The use of a rotary furnace has been based on the belief that small bodies of fused particles would tend to ride up the side of the rotating furnace and then roll down across the layer of material to pick up additional particles of material and thereby build up relatively large balls or masses of dense material. Although many attempts have been made to fuse and agglomerate finely divided materials in the rotary type furnace, these attempts have encountered numerous difficulties. One important and particularly troublesome difficulty encountered is that when the particles are at the fusion temperature, these particles and the small bodies of fused particles are sufficiently pasty and tacky to adhere to the interior surface of the furnace. Consequently, those particles which are at the fusion temperature tend to adhere to the furnace lining and do not roll down across the layer to pick up additional particles and form nodules. In a short time a relatively large massive ring of fused material is formed in the lower end of the furnace. Such a ring interferes with the movement of the material through the furnace. It is difficult to remove the adhering mass from the furnace wall and, at least quite often, it is necessary to stop the furnace and interrupt the process.

Accordingly, it is an object of the present invention to provide a method of and an apparatus for fusing and agglomerating particles of finely divided material in such a manner as to materially improve the agglomeration of the particles.

Another object of the present invention is to provide a method of and an apparatus for fusing and agglomerating particles of finely divided materials that will prevent objectionable adherence of the fused particles to the furnace wall.

Another object of the present invention is to remove immediately those particles which adhere to the furnace so that the particles will pick up other particles from the layer and form nodules.

A further object of the present invention is to provide both a method of and an apparatus for fusing and agglomerating particles of finely divided metal bearing material that will cause relatively small bodies of fused particles to roll downwardly and across a layer of material so as to enlarge these bodies as a result of the "snowballing" effect and produce relatively larger dense nodules of fused particles.

Another object of the present invention is to provide a method of and apparatus for agglomerating particles of finely divided metal bearing material in a rotary kiln in which the material adjacent the upper edge of the layer is "turned over" so that it rolls down across the layer instead of sliding down the surface of the rotary kiln.

It is also an object of the present invention to provide a method of and apparatus for agglomerating particles of finely divided metal bearing material that will form substantially all of the material into relatively large agglomerates.

A further object of the present invention is to provide apparatus for continuously fusing and agglomerating a charge of finely divided material that will function continuously over a relatively long period of time to produce relatively larger, dense bodies with a minimum amount of maintenance and repair.

In accordance with the present invention, the particles of material which fuse to the furnace wall in the fusion zone of a rotary furnace are removed in such a manner and the zone of removal is so located that the removed portions roll and move downwardly across the layer of material. These removed portions or bodies of fused particles pick up additional particles as they move across the layer of material so that the bodies are enlarged as a result of the "snowballing" effect. As a result of this improved "snowballing" effect substantially all of the material is formed into relatively larger, dense bodies or nodules of fused particles. The fused particles which fuse to the furnace wall, or which tend to fuse to the furnace wall, are substantially immediately removed away from the furnace wall and forced to the top of the layer of material. This, in addition to preventing the formation of the fused particles into massive rings, reduces the amount of material which adheres to the furnace and must be removed. In addition to removing the particles adhering to the furnace wall, the particles of material adjacent the upper edge of the layer may be forced away from the surface of the furnace so that they also roll down across the layer of material. As a result, the nodules are relatively larger and more dense and the quantity of material which normally passes through the furnace without being formed into nodules large enough to be of use is substantially reduced. Heretofore, the amount of non-fused particles and insufficiently fused nodules which had to be separated by screening and either discarded or reprocessed has been quite large.

These and other objects and advantages of the present invention will become more readily apparent from the following description, taken with the accompanying drawings, in which:

Figure 1 is a side elevational view of apparatus including a rotary furnace and embodying the features of the present invention, and having portions broken away to illustrate it more clearly;

Figure 2 is an enlarged transverse end view, partially in section, taken along line 2—2 of Figure 1;

Figure 3 is an enlarged fragmentary sectional view taken along line 3—3 of Figure 1;

Figure 4 is a fragmentary view, similar to Figure 3, showing a modification of the present invention;

Figure 5 is a side view, partially in section, of another apparatus also embodying the principles of the present invention; and, Figure 6 is a transverse sectional view taken along line 6—6 of Figure 5.

Referring to the drawings and more particularly to Figures 1, 2 and 3, a rotary, downwardly inclined furnace 10 includes an outer cylindrical sleeve 11 lined with a layer 12 of heat resistant material and is mounted in rings 13. The rings 13 are cradled on rollers 14 rotatably mounted in brackets 15 carried by piers 16. A large ring gear 18 encircles the furnace 10 and meshes with a pinion 19 mounted on shaft 20 of motor 21. The speed of motor 21 can be varied at will to rotate the furnace 10 about its longitudinal axis 23 and on rollers 14 at the desired speed. The furnace 10 is inclined downwardly from its upper inlet end portion 24 to the lower outlet end portion 25 adjacent the outlet 26. At the upper end 24 of the furnace, there is a flue 27 which communicates through passage 28 with stack 29. A downwardly inclined feed spout 30 extends into the upper end of the furnace for feeding material into the furnace. Any suitable means, not shown, may be provided for continuously feeding the material into the upper end of spout 30 and the furnace at a uniform rate of flow and this rate of flow may be varied when desirable. At the lower end of the furnace 10 there is a cover 32 supported by a framework 33 mounted on casters 34 for movement of the cover into operative position as shown and for movement to an inoperative position away from the furnace. Any suitable type of apparatus including usual chutes, and conveyor mechanism, not shown, may be provided for removing the fused products from the vicinity of the furnace. In the lower end 25 of the furnace 10 there is a blast pipe 35 connected to a source of combustion supporting gas, such as of preheated air, under pressure, not shown. The blast pipe 35 extends through the cover 32 and has an outlet at 36 for directing the hot blast of air downwardly against the material to burn the combustible material that is mixed with the metal bearing material and thereby heat the metal bearing material to the fusion temperature, as will be more fully described when describing the operation of the apparatus.

In accordance with the present invention, a hollow, water-cooled scraper blade 38 is mounted in the lower end portion 25 of the furnace where the particles are fused. The blade 38 is so positioned as to remove from the rising inner cylindrical surface of the furnace any material adhering thereto and is so positioned as to aid in forming relatively larger, dense bodies of fused particles. Blade 38 has an inlet pipe 39 communicating with a source of cooling water and an outlet pipe 40 communicating with a place of disposal so that cooling water continuously flows through the blade. A pair of spaced apart similar units 41 mounted on pier 42 support blade 38 in position with its end portion extending through an opening 43 of cover 32 into the furnace 10.

In operation which normally is continuous, the furnace 10 is rotated continuously at a predetermined speed about its longitudinal axis 23 and the material to be agglomerated is continuously fed at a uniform rate of flow into and through the spout 30 into the upper end of the furnace. The rotation of the furnace causes the material to move down through the furnace to the lower end portion in a substantially uniform layer 43. As shown more clearly in Figure 3, this layer 43 assumes an angle of repose as indicated at 44 with an edge 45 higher than the opposite edge 46. The higher edge 45 of the layer 43 is adjacent the rising side of the furnace. Normally, the angle of repose is about 45° but the magnitude of this angle depends on a number of factors including the speed of rotation of the furnace, the size and shape of the particles and the specific gravity of the material flowing through the furnace. When a certain material is charged into the furnace, the layer will assume a particular angle of repose. A blast of preheated air is continuously blown through pipe 35 into the lower end portion of the furnace and against the layer of material to effect fusion of the particles. In the upper, major portion of the furnace, the material absorbs heat from the furnace wall and from the hot gases flowing countercurrently up through the furnace. The material is heated to an elevated temperature but is not heated sufficiently to effect fusion of the particles in the preheating zone. When the charge reaches the lower end portion, or the fusion zone, the hot blast of air causes the combustible particles in the material to burn rapidly and generate sufficient heat to quickly raise the particles to their fusion temperature, normally about 2500° F. In this example, fusion is brought about by directing a blast of preheated air against the material in the fusion zone. Where fusion is effected in this manner, the material must contain some combustible material which will burn, such as carbon or sulphur, which has been added to or is originally contained in the material. Flue dust from a blast furnace, fine iron ore, and coke breeze can be mixed to form a mixture containing metal bearing material and combustible material. The flue dust contains some coke. Satisfactory results have been obtained when the charge contained about 15% of total combustible material. Where the heat of fusion is supplied by an external means, such as a burner, the charge need not contain any combustible carbon, although, some carbon may be added to aid in reducing the oxides so that the product will contain a somewhat higher percentage of metal than the metal bearing material charged into the furnace.

When the particles of metal bearing material are brought to the fusion temperature in the fusion zone, the particles become pasty and tend to adhere to the surface of the furnace and in a short time form relatively massive rings of fused material in the fusion zone of the furnace. These rings materially interfere with the agglomeration of the particles. Furthermore, the particles which are heated to the fusion temperature tend to adhere to the furnace so that they do not unite with or pick up other particles to form nodules. Normally, there is an appreciable percentage of the material which passes through the fusion zone without fusing and forming bodies sufficiently large enough to be useful in metallurgical furnaces. Accordingly, adherence of the particles to the furnace not only interferes with operation of the furnace but reduces the formation of nodules large enough and dense enough to be used, particularly in an open hearth furnace.

Applicant provides a blade particularly located to remove substantially immediately any particles adhering to the furnace and positioned to improve enlargement of the removed small fused bodies to produce relatively larger bodies. The blade 38 has two side surfaces 47 and 48 converging at an acute angle toward and intersecting at an edge 49. The side surface 48 faces toward the rising surface of the furnace. The blade is so located that this edge portion 49 is immediately adjacent the surface of the furnace and extends parallel with the longitudinal axis of rotation of the furnace. Preferably, the edge portion 49 of the blade is located adjacent the upper edge 45 of the layer of the material 43 so that as the adhering material is removed from the furnace surface, it rolls downwardly across the surface of the layer of material in the fusion zone so as to pick up additional particles of material and form larger bodies which tend to collect in the bottom of the furnace, from which location the bodies move to the outlet of the furnace. With the blade edge located adjacent the upper edge of the layer of material, those fused particles which adhere to the surface of the furnace are immediately removed. In addition, those particles which are at the fusion temperature and which are not adhering to the surface of the furnace are forced upwardly and inwardly to the top surface of the layer where they are rolled down across the material to pick up additional particles. The blade acts similar to a plow to turn over the particles at the upper edge of the layer so that the turned over materials roll down across the layer instead of sliding down the furnace surface. If the blade were located, for example, near the top of the furnace, the adhering fused particles would fall down to the bottom of the furnace and would not roll across the layer of material to enlarge themselves as a result of the "snowballing" effect. The non-adhering particles would not be turned over by the blade. Accordingly, the location of the blade is important in aiding in the production of nodules.

Preferably, the edge portion 49 of blade 38 is adjacent the higher side 45 of the layer of material, and the surface 47 which faces the material is inclined upwardly at an angle greater than 90° measured between the surface 47, and the imaginary plane that is tangent to the inner surface of the furnace where edge 49 is located. When the furnace is rotated at a slower speed or the material is heavier, the upper or higher edge of the layer of material may be below the transverse, horizontal axis 50 of furnace 10. With the higher edge below axis 50, the edge 49 of blade 38 can be positioned at the height shown in Figure 3 with the edge 49 located in the plane including the transverse horizontal axis 50 and the longitudinal axis of rotation of the lower end portion of the furnace. With the blade so positioned, the adhering particles are removed and the removed particles and bodies will pass completely across the layer 43 to pick up additional particles. Preferably, the edge 49 is positioned adjacent the edge of the layer of material, both to cut through the material adhering to the rising surface and remove adhering particles and to turn over the removed and the non-adhering particles. The turning over of the material is increased by having the surface inclined upwardly and inwardly as shown.

The blade 38 is supported in such a position that the side surface 48 diverges away from the rising inner cylindrical surface of the furnace. The space between the inner surface of the furnace and the side surface 48 increases rearwardly from the edge 49 so that any material which passes the blade edge 49 will not be crowded into a space that grows smaller at any point. Some material may at times pass the blade edge 49, and if this space between the blade and furnace was converging in any portion, such material would force the blade away from the furnace wall and might break the blade.

The blade 38 is adjustably supported by units 41. Each unit 41 includes a base member 51 which supports a plate 52. Each plate 52 contains a notch 53 and blade 38 is cradled in notches 53. Each base member includes a pair of arcuate slots 54 which are parallel to the inner surface of the furnace. A pair of bolts 55 extend through each plate 52 and a corresponding slot 54. The bolts 55 can be loosened to adjust the blade 38 upwardly or downwardly in a direction parallel to the inner surface of the furnace to position the edge 49 of blade 38 adjacent the edge 45 of the layer of material 43. The bolts 55 can be tightened to lock the blade in position. A bracket 56 is attached to the side of blade 38 and a bolt 57 extends through this bracket and an arcuate slot 58 in one of the plates 52 to permit tilting of blade 38 about its edge portion 49.

Referring more particularly to Figure 4, this fragmentary view shows a hollow blade 38' that can be substituted for blade 38. Blade 38' has a curved side surface 59 terminating in a side edge portion 60. The blade 38' is positioned the same as blade 38. The curved side surface 59 can be arranged to diverge continuously and more uniformly away from the inner rising surface of the furnace. This further reduces any chance of material being crowded and jammed between the blade and the furnace to and thereby move or break the blade 38'.

Referring more particularly to the embodiment of Figures 5 and 6, this agglomerating apparatus includes an upper rotary kiln or furnace 62 and a lower rotary furnace 63. The upper, relatively smaller furnace 62 is similar to the furnace of Figure 1 and will not be again described in detail. The furnace 62 is a preheat furnace in which the downwardly moving layer of material 64 is preheated by the countercurrently flowing hot gases passing upwardly through furnace 62 from furnace 63.

The lower, relatively shorter, larger diameter furnace 63 is the fusion furnace where the particles of the charge are heated to the fusion temperature and agglomerated. The furnace 63 includes an outer cylindrical shell 65 lined with refractory material 66 and having a pair of rings 67 rotatably mounted in supports 68 for rotation of the furnace about its longitudinal axis which is parallel with but downwardly offset from the axis of furnace 62. A large ring gear 69 is mounted on the furnace and is rotated by motor 70 through suitable gearing. A cover or shield 72 encircles the adjacent, offset ends of furnaces 63 and 62 and includes a chute 73 for guiding the preheated charge from furnace 62 down into furnace 63. A cover 74 closes the lower end of furnace 63 and includes an opening 75 through which the agglomerated material is discharged. Covers 72 and 74 may be supported in any suitable manner.

A blast pipe 76 is connected to a suitable source of hot air blast and projects into furnace 63 for discharging a blast of heated air downwardly against the layer 76' to burn the combustible material in the layer 76' and heat the charge to the fusion temperature to effect agglomeration of the particles of metal bearing material. As the particles are heated, they become tacky and tend to adhere to the inner surface of the furnace lining 66. This causes the difficulties described in connection with the furnace of Figure 1. A hollow water-cooled blade 78 extends all the way through the furnace 63 and through openings in covers 72 and 74. Blade 78 is supported outside of the furnace at each end by supports 79 and 80. The supports 79 and 80 preferably are similar to support 41 so as to provide for tilting adjustment of blade 78 as well as adjustment of the blade through an arc parallel to the inner surface of the furnace whereby the height of the blade can be adjusted. Different materials may assume a different angle of repose, and the blade can be readily adjusted so that edge 81 can be positioned adjacent the upper edge of layer 76' to obtain maximum "snowballing" of the material. In the scraper blade 78, like blade 38, edge 81 is formed at the intersection of the two converging, curved or arcuate side surfaces 82 and 83 arranged at an acute angle to each other. The side surface 82, like surface 48, diverges away from the inner cylindrical surface of the furnace. The side surface 83 is inclined upwardly and inwardly from the inner furnace surface and is inclined upwardly relative to a line normal to the tangent of the cylindrical surface of the furnace, the tangent being taken at the point where edge 81 is immediately adjacent the surface. The blade 78 with surface 83 moves the material outwardly away from the furnace lining so as to cause the particles to roll downwardly across layer 76' and pick up other particles instead of merely pushing the layer down which would not materially affect the "snowball" action. The blade 78, like blade 38, is arranged so that edge 81 is parallel to the axis of rotation of the furnace 63. Preferably, the edge 81 is adjacent the upper edge of the layer 76' so that the blade serves the dual function of both, immediately removing the particles adhering to the furnace and increasing the quantity of particles rolling downwardly across the layer.

The apparatus of Figure 5 is operated in substantially the same manner as that of Figure 1. The charge is fed into the upper end of the rotating furnace 62 and moves down through the furnace in a layer 64. The layer of material is preheated by the upwardly flowing gases. The preheated material is discharged into the fusion furnace 63 where the particles of combustible material are burned and the particles of metal bearing material are heated to the fusion temperature to form agglomerates. Both the particles which tend to adhere to the furnace and the particles adjacent the upper edge of the layer are caused by the blade 78 to roll down across the layer 76' and these rolling particles pick up additional particles, through a "snowballing" effect so that agglomerates formed and discharged are larger than those customarily formed. The blade 78 being supported at each end is quite stable and does not tend to chatter and can be readily maintained in position.

The present invention is not limited to the fusion and agglomeration of any particular material or any particular iron bearing material. Further, the present invention is not limited to any particular method or apparatus for effecting fusion of the particles of metal bearing material in the lower end or fusion zone of a rotary furnace. Other means for and methods of heating the material to the fusion temperature, such as shown in my copending applications, Serial No. 13,494 and Serial No. 13,495, now abandoned, both filed on the same date as the present application may be utilized.

The present method of and apparatus for fusing and agglomerating particles of material prevents the formation of rings on the internal surface of the rotary furnace and aids in increasing agglomeration of the particles to form relatively larger agglomerates. Further, the present invention agglomerates a greater percentage of the material so as to reduce the amount of material which passes through the furnace without forming agglomerates or nodules large enough to be utilized in metallurgical furnaces.

I claim:

1. The method of continuously fusing and agglomerating particles of material in an inclined rotary furnace means comprising the steps of continuously rotating such a furnace means about its longitudinal axis and passing a charge of such material down and through the furnace means in a layer and causing the layer to assume an angle of repose with one side edge higher than the other, continuously heating and effecting sufficient fusion of at least portions of the material in the lower end of the furnace means so that portions of the material adhere to the furnace means wall, and substantially immediately removing the adhering portions from the rising side of the furnace means wall along a line extending parallel to the longitudinal axis of the furnace means, the line being located in a zone lying between the upper edge of the layer and the plane including the transverse horizontal axis and the axis of rotation of the lower end of the furnace means, and forcing the removed fused portions inwardly away from the furnace means wall and thereby causing the removed portions to roll and move from the upper edge downwardly across the layer of material toward the lower edge of the layer and pick up additional particles of material.

2. In apparatus for continuously fusing and agglomerating particles of material, the combination comprising an inclined rotary furnace means having an inner cylindrical surface and an outlet at the lower end of the furnace means, means for rotating the furnace means so that the material is moved down through the furnace means to the outlet in a layer having an angle of repose with one edge higher than the other, means for heating the particles at the lower end of the furnace means to the fusion temperature whereby portions of the material adhere to the inner cylindrical surface, and a hollow, liquid-cooled, elongated cutter blade having opposite side surfaces converging together at an acute angle to a cutting edge extending in a direction parallel to the axis of rotation of the lower end of the furnace means and with said cutting edge immediately adjacent the rising inner cylindrical surface of the lower end of the furnace means in position to remove fused portions of the charge from the inner surface, one side surface facing the layer of material and extending upwardly from the cutting edge at an angle greater than 90° measured between the one side surface and a plane tangent to the inner cylindrical surface at the cutting edge to force the removed portions inwardly away from the inner cylindrical surface and the cutting edge being adjacent the upper edge of the layer of material to cause the removed portions to roll and move from the upper edge downwardly across the layer of material toward the lower edge of the layer and pick up additional particles of material.

3. In apparatus for continuously fusing and agglomerating particles of material, the combination comprising an inclined rotary furnace means having an inner cylindrical surface and an outlet at the lower end of the furnace means, means for rotating the furnace means so that the material is moved down through the furnace means to the outlet in a layer having an angle of repose with one edge higher than the other, means for heating the particles at the lower end of the furnace means to the fusion temperature whereby portions of the material adhere to the inner cylindrical surface, and a hollow, liquid-cooled, elongated cutter blade having opposite side surfaces converging together at an acute angle to a cutting edge supported in a fixed position inside the furnace with the cutting edge extending in a direction parallel to the axis of rotation of the furnace means, said cutting edge being adjacent the rising, inner cylindrical surface of the lower end of the furnace means to remove the fused portion of the material from the inner cylindrical surface, one side surface facing the layer of the material and extending upwardly from the cutting edge at an acute angle greater than 90° measured between the one side surface and a plane tangent to the inner surface at the cutting edge to force the removed portions inwardly away from the surface and the cutting edge being in a zone between adjacent the upper edge portion of the layer of material and the plane including the transverse horizontal axis and the axis of rotation of the lower end of the furnace means so that the removed portions roll and move from the upper edge downwardly across the layer of material toward the lower edge of the layer and pick up additional particles of material.

4. In apparatus for continuously fusing and agglomerating particles of material, the combination comprising an inclined rotary furnace means having an inner cylindrical surface and an outlet at the lower end of the furnace means, means for rotating the furnace means so that the material is moved down through the furnace means to the outlet in a layer having an angle of repose with one edge higher than the other, means for heating the particles at the lower end of the furnace means to the fusion temperature whereby portions of the material adhere to the inner cylindrical surface, and a hollow, liquid-cooled, elongated cutter blade having opposite side surfaces converging together at an acute angle to a cutting edge supported in a fixed position inside the furnace means with the cutting edge extending in a direction parallel to the axis of rotation of the furnace means, said cutting edge being adjacent the rising, inner cylindrical surface of the lower end of the furnace means to remove fused portions of the material from the inner cylindrical surface, one side surface facing the layer of the material and extending upwardly from the cutting edge at an acute angle greater than 90° measured between the one side surface and a plane tangent to the inner surface at the cutting edge to force the removed portions inwardly away from the surface and the cutting edge being in a zone between adjacent the upper edge of the layer of material and the plane including the transverse horizontal axis and the axis of rotation of the lower end of the furnace means so that the removed portions roll and move from the upper edge downwardly across the layer of material toward the lower edge of the layer and pick up additional particles of material, the opposite side surface of the cutter blade facing the rising inner cylindrical surface and diverging upwardly from the cutting edge and away from the rising inner cylindrical surface to prevent crowding of material between the rising inner cylindrical surface and the opposite side surface of the cutter blade.

5. In apparatus for continuously fusing and agglomerating particles of material in which a charge including particles of such agglomerating material and particles of combustible material is moved through a rotary furnace means, the combination comprising an inclined rotary furnace means having an inner cylindrical surface and an outlet at the lower end of the furnace means, means for rotating the furnace means so that the charge is moved down through the furnace means to the outlet in a layer having an angle of repose with one edge higher than the other, means for directing a blast of heated combustion supporting gas against the layer at the lower end of the furnace means to burn the particles of combustible material for heating the particles of agglomerating material to the fusion temperature whereby portions of the agglomerating material adhere to the inner cylindrical surface, and a hollow, liquid-cooled, elongated cutter blade having opposite side surfaces converging together at an acute angle to a cutting edge supported in a fixed position inside the furnace with the cutting edge extending in a direction parallel to the axis of rotation of the furnace means, said cutting edge being adjacent the rising, inner cylindrical surface of the lower end of the furnace means to remove fused portions of the material from the inner cylindrical surface, one side surface facing the layer of the material and extending upwardly from the cutting edge at an acute angle greater than 90° measured between the one side surface and a plane tangent to the inner cylindrical surface at the cutting edge to force the removed portions inwardly away from the inner cylindrical surface and the cutting edge portion being in a zone between adjacent the upper edge of the layer of material and the plane including the transverse horizontal axis and the axis of rotation of the lower end of the furnace means so that the removed portions roll and move from the upper edge downwardly across the layer of material toward the lower edge of the layer and pick up additional particles of material, the opposite side surface facing the rising inner cylindrical surface diverging upwardly from the cutting edge away from the rising inner surface to prevent crowding of material between the rising inner surface and the opposite side surface of the cutter blade.

6. In apparatus for continuously fusing and agglomerating particles of material, the combination comprising an inclined rotary furnace means having an inner cylindrical surface and an outlet at the lower end of the furnace means, means for rotating the furnace means so that the material is moved down through the furnace means to the outlet in a layer having an angle of repose with one edge higher than the other, means for heating the particles at the lower end of the furnace means to the fusion temperature whereby portions of the material adhere to the inner cylindrical surface, and a hollow, liquid-cooled, elongated cutter blade having opposite side surfaces converging together at an acute angle to a cutting edge, and means supporting the cutter blade in a fixed position inside the furnace means with the cutting edge extending in a direction parallel to the axis of rotation of the furnace means, said cutting edge being adjacent the rising, inner cylindrical surface of the lower end of the furnace means to remove the fused portions of the material from the inner cylindrical surface, one side surface facing the layer of the material and extending upwardly from the cutting edge at an acute angle greater than 90° measured between the one side surface and a plane tangent to the inner cylindrical surface at the cutting edge to force the removed portions inwardly away from the cylindrical surface and the cutting edge being in a zone between adjacent the upper edge of the layer of material and the plane including the transverse horizontal axis and the axis of rotation of the lower end of the furnace means so that the removed portions roll and move from the upper edge downwardly across the layer of the material toward the lower edge of the layer and pick up additional particles of material, the opposite side surface facing the rising inner surface diverging upwardly from the cutting edge away from the rising inner cylindrical surface to prevent crowding of material between the rising inner cylindrical surface and the opposite side surface of the cutter blade, said supporting means supporting the cutter blade for adjustment upwardly and downwardly in an arc parallel to the inner surface of the furnace to position said cutting edge portion and supporting the blade for tilting movement about said cutting edge to maintain the opposite side surface diverging away from the inner surface of the furnace means.

7. In apparatus for continuously fusing and agglomerating particles of material, the combination comprising an inclined rotary furnace means having an inner cylindrical surface and an outlet at the lower end, said furnace means including a relatively longer, upper preheat portion and a relatively shorter, lower fusion portion with said portions being separate, means for independently rotating the portions so that the material is moved down through the furnace means to the outlet in the lower fusion portion in a layer having an angle of repose with one edge higher than the other and is preheated in the preheat portion and then discharged into the fusion portion, means for heating the preheated particles of material in the fusion portion to the fusion temperature whereby portions of the material adhere to the inner cylindrical surface of the fusion portion, and a hollow, liquid-cooled, elongated cutter blade extending through the lower fusion portion and having the opposite ends thereof supported outside of the lower fusion portion, at least the portion of the blade in the furnace having opposite side surfaces converging together at an acute angle to a cutting edge held in a fixed position with the cutting edge portion extending in a direction parallel to the axis of rotation of the fusion portion, said cutting edge portion being adjacent the rising, inner cylindrical surface of the fusion portion to remove fused portions of the material from the inner cylindrical surface, one side surface facing the layer of material and extending upwardly from the cutting edge at an acute angle greater than 90° measured between the one side surface and a plane tangent to the inner cylindrical surface at the cutting edge to force the removed portions inwardly away from the inner cylindrical surface and the cutting edge being in a zone between adjacent the upper edge of the layer of the material and the plane including the transverse horizontal axis and the axis of rotation of the lower end of the fusion portion so that the removed portions roll and move from the upper edge downwardly across the layer of material toward the lower edge of the layer and pick up additional particles of material, the opposite side surface of the cutter blade facing the rising inner cylindrical surface and diverging upwardly from the cutting edge and away from the rising inner cylindrical surface to prevent crowding of the material between the rising inner cylindrical surface and the opposite side surface of the cutter blade.

LEWIS B. LINDEMUTH.

REFERENCES CITED

The following references are of record in the file of this patent:

UNITED STATES PATENTS

| Number | Name | Date |
|---|---|---|
| 1,004,085 | Ross | Sept. 26, 1911 |